United States Patent [19]

Grundmann

[11] Patent Number: 5,699,860
[45] Date of Patent: Dec. 23, 1997

[54] FRACTURE PROPPING AGENTS AND METHODS

[75] Inventor: Steven R. Grundmann, Duncan, Okla.

[73] Assignee: Halliburton Energy Services, Inc., Duncan, Okla.

[21] Appl. No.: 603,837

[22] Filed: Feb. 22, 1996

[51] Int. Cl.$^6$ .................................................. F21B 43/267
[52] U.S. Cl. ........................... 166/280; 166/300; 166/308; 507/924
[58] Field of Search .................. 166/279, 280, 166/300, 308; 507/921, 924

[56] References Cited

U.S. PATENT DOCUMENTS

| | | | |
|---|---|---|---|
| 2,879,847 | 3/1959 | Irwin | 166/280 X |
| 3,155,162 | 11/1964 | Flickinger et al. | 166/280 |
| 3,173,484 | 3/1965 | Huitt et al. | 166/280 |
| 3,195,635 | 7/1965 | Fast | 166/280 |
| 3,285,340 | 11/1966 | Huitt et al. | 166/280 |
| 3,399,727 | 9/1968 | Graham et al. | |
| 3,497,008 | 2/1970 | Graham et al. | 166/280 |
| 3,531,409 | 9/1970 | Seffens et al. | 166/280 X |
| 3,782,469 | 1/1974 | Fulford | 166/279 |
| 4,462,466 | 7/1984 | Kachnik | 166/280 |
| 4,547,468 | 10/1985 | Jones et al. | 166/280 X |
| 4,671,909 | 6/1987 | Torobin | 166/240 X |
| 4,676,166 | 6/1987 | McDougall et al. | 166/280 X |
| 5,165,479 | 11/1992 | Harris et al. | 166/300 |

*Primary Examiner*—George A. Suchfield
*Attorney, Agent, or Firm*—Robert A. Kent

[57] ABSTRACT

Improved fracture propping agents and methods of using such agents are provided. The propping agents are basically comprised of a plurality of small pieces which are suspendable in a fracturing fluid and have adequate compressive strength to prevent the closure of a fracture into which they are carried. The propping agent pieces have passageways formed therethrough containing a dissolvable substance whereby when the substance is dissolved, the permeability of the propping agent to the flow of formation fluids is increased.

4 Claims, No Drawings

5,699,860

FRACTURE PROPPING AGENTS AND METHODS

BACKGROUND OF THE INVENTION

1. Field of the Invention

This invention relates to improved fracture propping agents and methods of using the agents for propping fractures formed in subterranean producing formations penetrated by well bores.

2. Description of the Prior Art

Hydraulic fracturing is a widely used technique for stimulating the production of fluids, such as oil and gas, from subterranean formations. Fracturing is commonly performed by contacting a subterranean formation with a viscous fracturing fluid that contains a propping agent suspended therein. Sufficient hydraulic pressure is applied to the subterranean formation by way of the fracturing fluid and surface pumping equipment to cause one or more fractures to be created in the subterranean formation. After initial fracturing occurs, the fracturing fluid is pumped at a sufficient rate and pressure to cause the fracturing fluid to flow into the created fractures and extend them in the formation. The propping agent suspended in the fracturing fluid is carried into the fractures so that when the flow rate of the fracturing fluid is reduced, the propping agent is deposited in the fractures and the fractures are prevented from closing thereby. However, even though the propping agent prevents the fractures from closing, the flow of produced formation fluids such as oil and/or gas through the fractures is still often impeded by the compressed propping agent. For example, sand has heretofore been utilized as fracture propping agent with the sand particles having sizes in the range of from about 8 to about 200 mesh on the U.S. Sieve Series scale. When the fractures close on the sand, it is tightly packed whereby the flow of fluids through the sand contained in the fractures is still appreciably restricted. The same is true of other propping agents heretofore used including ceramic particles and spheres, plastic and glass beads, steel shot, crushed shells and other objects having various geometric shapes.

Propping agent particles having passageways formed therein have been developed heretofore. For example, U.S. Pat. No. 4,462,466 issued on Jul. 31, 1984 to Kachnik discloses particles of propping agent having passageways formed therethrough. However, the passageways of such propping agent are susceptible to being permanently plugged by sediment in the fracturing fluid used and by fine particles encountered by the propping agent in the well bore and in the formation during and immediately after its placement in the created fractures.

Thus, it would be desirable and there is a need for a fracture propping agent which provides increased permeability after being deposited in fractures and being compressed by the closure pressure of the fractures.

SUMMARY OF THE INVENTION

The present invention provides improved fracture propping agents and methods of propping fractures in subterranean formations using such propping agents which meet the needs described above and overcome the shortcomings of the prior art. The improved fracture propping agents basically comprise a plurality of small pieces having sizes and densities such that they can be suspended in a fracturing fluid and carried into a fracture thereby. The pieces have adequate compressive strength to prevent the closure of the fracture and have passageways formed therethrough. The passageways of the pieces contain a dissolvable substance whereby when the substance is dissolved, the passageways are opened and the permeability of the propping agent to the flow of formation fluids is increased.

The dissolvable substance contained in the passageways of the propping agent pieces can be any substance dissolvable by the fracturing fluid or produced formation fluids. Preferably, the dissolvable substance has a utility which enhances the fracturing procedure or the production of formation fluids through propped fractures. For example, the dissolvable substance can be a gel breaker dissolvable by a gelled fracturing fluid or a paraffin or scale inhibitor dissolvable by produced fluids. The dissolvable substance can also be a surfactant or a lightweight material which increases the buoyancy of the propping agent thereby improving suspension, transport and placement of the propping agent in the fracture.

The methods of the invention for propping a fracture in a subterranean formation basically comprise the steps of introducing a propping agent of the invention as described above into a fracture and allowing the dissolvable substance in the passageways of the propping agent to be dissolved whereby the permeability of the propping agent in the fracture is increased.

It is, therefore, a general object of the present invention to provide improved fracture propping agents and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, the hydraulic fracturing of a subterranean hydrocarbon producing formation generally involves pumping a viscous fracturing fluid containing suspended propping agent into the formation at a rate whereby fractures are created therein. The continued pumping of the fracturing fluid extends the fractures in the formation and carries the propping agent suspended therein into the fractures. Upon the reduction of the flow of the fracturing fluid and the reduction in pressure exerted on the formation, the propping agent is deposited in the fractures and the fractures are prevented from closing by the presence of the propping agent therein.

Typical fracturing fluids which have been utilized heretofore include gelled water or oil base liquids, foams and emulsions. The foams utilized have generally been comprised of a water base liquid containing one or more foaming agents foamed with a gas such as nitrogen. Emulsions formed of two or more immiscible liquids have also been utilized. A particularly useful emulsion for carrying out formation fracturing procedures is comprised of a water base liquid and a liquified, normally gaseous fluid such as carbon dioxide. Upon pressure release, the liquified gaseous fluid vaporizes and rapidly flows out of the formation.

The most common fracturing fluid utilized heretofore has been comprised of an aqueous liquid such as fresh water or salt water combined with a gelling agent for increasing the viscosity of the fluid. The increased viscosity reduces fluid loss and allows the fracturing fluid to transport significant concentrations of propping agent into the created fractures.

A variety of gelling agents have been utilized including hydratable polymers which contain one or more of the functional groups such as hydroxyl, cis-hydroxyl, carboxyl, sulfate, sulfonate, amino or amide. Particularly useful such polymers are polysaccarides and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and copolymers which contain the above mentioned functional groups and which have been utilized heretofore include polyacrylate, polymethacrylate, polyacrylamide, maleic anhydride methylvinyl ether copolymers, polyvinyl alcohol and polyvinylpyrrolidone.

Preferred hydratable polymers which yield high viscosities upon hydration, i.e., apparent viscosities in the range of from about 10 centipoises to about 90 centipoises at a concentration in the range of from about 10 pounds per 1,000 gallons to about 80 pounds per 1,000 gallons in water, are guar gum and guar derivatives such as hydroxypropylguar and carboxymethylguar, cellulose derivatives such as hydroxyethyl cellulose, carboxymethylcellulose and carboxymethylhydroxyethylcellulose, locust bean gum, carrageenan gum and xanthan gum.

The viscosities of aqueous polymer solutions of the types described above can be increased by combining cross-linking agents with the polymer solutions. Examples of cross-linking agents which can be utilized are multivalent metal salts or compounds which are capable of releasing the metal ions in an aqueous solution. Examples of such multivalent metal ions are chromium, zirconium, antimony, titanium, iron (ferrous or ferric), zinc and aluminum.

The above gelled or gelled and cross-linked fracturing fluids can also include gel breakers such as those of the enzyme type, the oxidizer type or the acid buffer type which are well known to those skilled in the art. The gel breakers cause the viscous fracturing fluids to revert to thin fluids that can be produced back to the surface after they have been used to produce fractures in a subterranean formation.

As also mentioned above, propping agent is suspended in the viscous fracturing fluid so that it is carried into the created fractures and deposited therein when the flow rate of the fracturing fluid and the pressure exerted on the fractured subterranean formation are reduced. The propping agent functions to prevent the fractures from closing due to overburden pressures, i.e., to prop the fractures open, whereby produced fluids can flow through the fractures. However, as mentioned above, the presence of propping agent such as sand, ceramic or glass beads and the like impedes or restricts the flow of produced formation fluids through the propped fractures.

In accordance with the present invention, an improved propping agent is provided which has increased permeability to produced formation fluids as compared to propping agents utilized heretofore. The improved propping agent of this invention is comprised of a plurality of small pieces which have sizes and densities such that they can be suspended in a fracturing fluid and adequate compressive strengths to prevent the closure of the fractures in which they are deposited. Each of the pieces includes at least one passageway formed therethrough which contains a substance which is dissolvable by the fracturing fluid utilized or produced formation fluids, or both. When the dissolvable substance is dissolved and thereby removed from the passageways of the propping agent pieces, the permeability of the propping agent to the flow of formation fluids is increased.

As mentioned above, propping agent particles having passageways formed therein have been developed heretofore. However, the passageways of such propping agent are susceptible to being permanently plugged by sediment in the fracturing fluid used and by fine particles encountered by the propping agent in the well bore and in the formation during and immediately after its placement in the created fractures. This plugging of the passageways is prevented in the use of the propping agent of this invention by the presence of the dissolvable substance in the propping agent passageways during and after placement.

While the propping agent pieces can be of various shapes, it is preferable that the pieces are tubular in shape. For example, the propping agent pieces can each be an elongated tube having a longitudinal passageway therethrough. Preferably, the tubular pieces are curved to prevent major portions of the pieces from being aligned with the passageways thereof oriented transversely to the direction of formation fluid flow. For example, the curved tubular pieces can have C-shapes, S-shapes and other similar shapes. The pieces can be formed of a variety of materials including metals, plastics, ceramics, and the like. Generally, the pieces are preferably formed of a plastic material having adequate strength which can be extruded or otherwise formed in a desired tubular shape or shapes.

The sizes of the propping agent pieces that are utilized in fracturing procedures can range from very small sizes to relatively large sizes. For example, the pieces may range from a small size of about 0.02 inch in diameter or thickness by about 0.06 inch in length to a maximum size of about 0.15 inch in diameter or thickness by 0.4 inch in length. Preferably, the pieces are tubular in shape and have diameters in the range of from about 0.05 inch to about 0.1 inch and lengths in the range of from about 0.1 inch to about 0.4 inch. Most preferably, the tubular pieces are within the above size range and are C-shaped.

As indicated above, the passageways in the propping agent pieces initially contain a dissolvable solid or substantially solid material which plugs the passageways and prevents them from being clogged by sand or other small particles contained in the fracturing fluid or in the formation being fractured. The dissolvable substance can be any substance which is slowly dissolvable in the fracturing fluid utilized or dissolvable in produced formation fluids such as oil, brine or both. Preferably, the dissolvable substance utilized for preventing plugging of the passageways in the propping agent also has utility in the fracturing procedure or in the production of formation fluids. For example, the dissolvable substance can include one of the above mentioned types of gel breakers which functions to cause the gelled fracturing fluid utilized to revert to a thin fluid. Alternatively, the dissolvable substance can include a paraffin deposit inhibitor, a scale inhibitor, a buoyancy imparting material, a flow enhancing surfactant or other material. As will be understood by those skilled in the art, the dissolvable substance utilized in the propping agent used for propping fractures formed in a particular formation can include one or more of the utilitarian materials described above or various other materials for bringing about desired results.

Examples of commercially available gel breakers that can be incorporated in the dissolvable substance utilized in the passageways of the propping agent of this invention include "GBW-30™", "OPTIFLO II™" and "OPTIFLO AC™"

which are all commercially available from Halliburton Energy Services of Duncan, Okla. Examples of paraffin inhibitors which can be used are "PARACHEK S-100™" and "PARACHEK S-180™" and examples of scale inhibitors are "SCALECHEK LP-55™" and SCP-2™, all of which are also available from Halliburton. The gel breaking and inhibiting materials as well as other materials can be combined with oil dissolvable or water dissolvable binders which form a substantially solid plug in the passageways of the propping agent pieces at temperatures in the range of from about 70° F. to about 250° F. Examples of such binders are latexes, paraffins and salts.

The methods of this invention for propping a fracture in a subterranean formation are comprised of the steps of introducing a propping agent into the fracture consisting of a plurality of small pieces having sizes and densities such that they can be suspended in a fracturing fluid and having adequate compressive strength to prevent the closure of the fracture. The propping agent pieces have passageways formed therethrough which contain a dissolvable substantially solid plugging substance therein. After the propping agent pieces are placed in a fracture, the dissolvable substance is allowed to be dissolved by the fracturing fluid utilized to carry the propping agent into the fracture or by formation fluids produced from the fractured formation. As mentioned, the dissolvable substance can contain a variety of materials or chemicals, the presence of which in the fracturing fluid or produced formation fluids bring about desired beneficial results.

In order to further illustrate the improved propping agent and methods of this invention, the following examples are given.

EXAMPLE 1

A well is fractured with a high viscosity borate cross-linked gelled fracturing fluid. The pH of the fracturing fluid is maintained at a level of about 10 during the fracturing treatment and propping agent comprised of graded sand and the hollow propping agent of this invention is suspended therein. The internal passageways of the hollow propping agent contain fumaric acid in an amount of about 20% by volume of the propping agent.

The fumaric acid is retained in the hollow propping agent during placement by a slowly water dissolvable latex coated on the propping agent. After the propping agent is deposited in the formed fractures and the well is returned to production, the latex is dissolved by produced water thereby releasing the fumaric acid into the cross-linked gelled fracturing fluid remaining in the fractures.

The propping agent containing fumaric acid is included in the fracturing fluid in an amount of about 0.25 pounds per gallon which when dissolved results in a concentration of fumaric acid in the cross-linked gel of about 5 pounds of fumaric acid per 1,000 gallons of the gel. When the fumaric acid is dissolved into the cross-linked gel, the pH of the gel is reduced to about 7.5 whereby the viscosity of the gel is lowered from about 1,400 centipoises to about 50 centipoises.

After the fracturing fluid is broken, i.e., reverted to a thin fluid, the well is placed on production whereby the pressure in the well is reduced, the fractures close on the propping agent and the thin fracturing fluid is produced back to the surface. The resulting propped fractures have increased permeabilities as a result of the hollow propping agent therein.

EXAMPLE 2

A well in a formation producing water which forms scale on tubular goods during production is fractured with a fracturing fluid having a hollow propping agent of the present invention containing sodium calcium phosphate suspended therein. The sodium calcium phosphate is a scale inhibitor which is slowly soluble in produced water and minimizes the formation of scale at a concentration in the water of from about 1 ppm to about 5 ppm.

A total of about 500 pounds of the hollow proppant is deposited in the formed fractures and the scale inhibitor contained in the hollow proppant is slowly dissolved in water produced by the well. The treated well produces 50 barrels of water per day for over 2 years without significant scale being formed on the tubular goods.

EXAMPLE 3

A gas well is fractured with a gelled fracturing fluid containing propping agent comprised of sand and the hollow propping agent of the present invention containing a slowly water dissolvable surfactant. After the completion of the fracturing treatment, the well is placed on production and the surfactant in the hollow propping agent is slowly dissolved in formation water produced along with the gas. The presence of the surfactant in the water facilitates the lifting of the water through the well bore by the gas. Also, the propped fractures have increased permeabilities due to the presence of hollow propping agent therein.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved method of propping a fracture in a subterranean formation comprising the steps of:

introducing a propping agent into said fracture consisting of a plurality of small pieces having sizes and densities such that they can be suspended in a fracturing fluid and carried into a fracture thereby, having adequate compressive strength to prevent the closure of said fracture and having passageways formed therethrough containing a dissolvable substance including a gel breaker dissolvable by said fracturing fluid whereby when said substance is dissolved, the permeability of said propping agent to the flow of formation fluids is increased; and allowing said substance to be dissolved.

2. The method of claim 1 wherein said pieces are formed of a material selected from the group consisting of metals, plastics and ceramics.

3. The method of claim 1 wherein said propping agent is tubular in shape.

4. The method of claim 1 wherein said propping agent is formed of an extrudable plastic material.

* * * * *